United States Patent
Bestgen

(10) Patent No.: US 9,937,754 B2
(45) Date of Patent: Apr. 10, 2018

(54) TIRE FOR TWO-WHEELED VEHICLES, COMPRISING A TREAD HAVING A CIRCUMFERENTIALLY CONTINUOUS GROOVE

(75) Inventor: Luc Bestgen, Chatel-Guyon (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 444 days.

(21) Appl. No.: 13/578,676

(22) PCT Filed: Feb. 4, 2011

(86) PCT No.: PCT/EP2011/051635
§ 371 (c)(1),
(2), (4) Date: Oct. 23, 2012

(87) PCT Pub. No.: WO2011/098404
PCT Pub. Date: Aug. 18, 2011

(65) Prior Publication Data
US 2013/0206296 A1      Aug. 15, 2013

(30) Foreign Application Priority Data
Feb. 12, 2010   (FR) ...................................... 10 50991

(51) Int. Cl.
*B60C 11/117*      (2006.01)
*B60C 11/12*       (2006.01)
(Continued)

(52) U.S. Cl.
CPC ............ *B60C 11/03* (2013.01); *B60C 11/032* (2013.01); *B60C 11/0306* (2013.01);
(Continued)

(58) Field of Classification Search
CPC ............... B60C 11/0323; B60C 11/032; B60C 11/1272; B60C 11/1281; B60C 11/0332;
(Continued)

(56) References Cited

U.S. PATENT DOCUMENTS

D114,954 S  *  5/1939  Kraft ......................... 152/209.28
2,267,406 A  * 12/1941  Krusemark ............... 152/209.19
(Continued)

FOREIGN PATENT DOCUMENTS

DE          2536470        2/1977
DE          3912358 A1  * 11/1989  ............. B60C 11/04
(Continued)

OTHER PUBLICATIONS

Summary: JP04-274902; Kodera, Takeshi; (no date).*

*Primary Examiner* — Michael H. Wilson
*Assistant Examiner* — Kendra Ly
(74) *Attorney, Agent, or Firm* — Cozen O'Connor

(57) ABSTRACT

A tire for a motorized two-wheeled vehicle comprising a reinforcing structure of the carcass type, made up of reinforcing elements, anchored on each side of the tire to a bead the base of which is intended to be mounted on a rim seat, each bead being extended radially outward by a sidewall, the sidewalls radially toward the outside joining to a tread. At least the central part of the tread comprises at least one circumferentially continuous cut, the cut being made up, for at least 80% of its length of at least one incision and at most 20% of at least one part having a width greater than that of an incision and the apparent area of the at least one incision is greater than the apparent area of the at least one part having a width greater than that of an incision.

17 Claims, 4 Drawing Sheets

(51) Int. Cl.
    *B60C 11/03*    (2006.01)
    *B60C 11/04*    (2006.01)

(52) U.S. Cl.
    CPC ............ *B60C 11/04* (2013.01); *B60C 11/12* (2013.01); *B60C 11/1281* (2013.01); *B60C 2011/0383* (2013.01); *B60C 2011/1209* (2013.01); *B60C 2200/10* (2013.01)

(58) Field of Classification Search
    CPC ... B60C 11/12; B60C 11/117; B60C 11/1204; B60C 2200/10; B60C 2011/1227; B60C 2011/133; B60C 2011/0383; B60C 2011/1209; B60C 2011/1277; B60C 2011/1213
    USPC ............ 152/209.11, 209.17, 209.18, DIG. 3, 152/209.5, 531, 902, 526
    See application file for complete search history.

(56) References Cited

U.S. PATENT DOCUMENTS

| | | | | |
|---|---|---|---|---|
| 2,298,033 | A | * | 10/1942 | Bowers et al. .......... 152/209.18 |
| 2,322,505 | A | * | 6/1943 | Bull ........................ 152/209.21 |
| D155,006 | S | * | 8/1949 | Grimes .................... 152/209.28 |
| 2,781,815 | A | * | 2/1957 | Davis ................ B60C 11/0306 152/209.1 |
| 2,821,231 | A | * | 1/1958 | Kraft .................. B60C 11/0309 152/209.22 |
| 2,869,609 | A | * | 1/1959 | Balzhiser et al. ....... 152/209.21 |
| 3,556,190 | A | * | 1/1971 | Riches ................ B60C 11/0309 152/209.21 |
| 4,140,168 | A | * | 2/1979 | Caretta ........................ 152/527 |
| 4,387,754 | A | | 6/1983 | Mirtain et al. |
| 4,683,928 | A | * | 8/1987 | Yahagi ....................... 152/209.5 |
| 4,703,787 | A | * | 11/1987 | Ghilardi ................ 152/209.21 |
| 5,358,020 | A | | 10/1994 | Haas |
| 2005/0183809 | A1 | | 8/2005 | Prost et al. |
| 2010/0089511 | A1 | | 4/2010 | Terada |
| 2010/0122760 | A1 | * | 5/2010 | Takahashi ................ 152/209.18 |
| 2010/0180996 | A1 | | 7/2010 | Nakagawa |

FOREIGN PATENT DOCUMENTS

| | | | |
|---|---|---|---|
| DE | 202008008298 | | 9/2008 |
| EP | 0561326 | | 9/1993 |
| EP | 2116395 | | 11/2009 |
| FR | 791250 | | 12/1935 |
| FR | 1568434 | | 5/1969 |
| FR | 2418719 | | 9/1979 |
| GB | 491139 | | 8/1938 |
| GB | 491139 A | * | 8/1938 |
| GB | 2056925 | | 3/1981 |
| GB | 2017597 | | 8/1982 |
| JP | 04274902 A | * | 9/1992 ............. B60C 9/18 |
| JP | 6106917 | | 4/1994 |
| JP | 2009101743 | | 5/2009 |
| WO | WO2004018236 | | 3/2004 |
| WO | WO2008149611 | | 12/2008 |

* cited by examiner

TIRE FOR TWO-WHEELED VEHICLES, COMPRISING A TREAD HAVING A CIRCUMFERENTIALLY CONTINUOUS GROOVE

RELATED APPLICATIONS

This is a U.S. national stage of application No. PCT/EP2011/051635, filed on Feb. 4, 2011. Priority is claimed based on the following application: French Application No.: 10/50991 filed on Feb. 12, 2010, the content of which is hereby incorporated herein by reference.

FIELD OF THE INVENTION

The invention relates to a tire intended to be fitted to a vehicle and more particularly intended to be fitted to a two-wheeled vehicle such as a motorbike and, more specifically still, to a tire intended to be fitted to a motorbike with a speed rating higher than W which corresponds to a speed of 270 km/h.

Although not limited to such an application, the invention will be described more particularly with reference to such a motorcycle or motorbike tire.

BACKGROUND OF THE INVENTION

As with all other tires, motorbike tires too are going radial, the architecture of such tires comprising a carcass reinforcement made up of one or two layers of reinforcing elements which with the circumferential direction make an angle that may be between 65 and 90°, the said carcass reinforcement being radially surmounted by a crown reinforcement made up of reinforcing elements. However, some non-radial tires do still remain and the invention relates to these also. The invention further relates to tires which are partially radial, which means tires in which the reinforcing elements of the carcass reinforcement are radial over at least part of the said carcass reinforcement, for example in the part corresponding to the crown of the tire.

Numerous crown reinforcement architectures have been proposed, depending on whether the tire is intended to be fitted at the front of the motorbike or fitted at the rear. A first structure, for the said crown reinforcement, involves using only circumferential cords, and the said structure is more particularly used for rear tires. A second structure, inspired directly by the structures commonly used on passenger vehicle tires, has been used to improve resistance to wear, and involves using at least two working crown layers of reinforcing elements that are substantially parallel to one another within each layer but crossed from one layer to the next, making acute angles with the circumferential direction, such tires being more particularly suitable as front tires for motorbikes. The said two working crown layers may be combined with at least one layer of circumferential elements, generally obtained by helical winding of a strip of at least one rubber-coated reinforcing element.

The choice of tire crown architecture has a direct impact on certain properties of the tire, such a wear, endurance, grip or even drivability or, particularly in the case of motorbikes, stability. However, other tire parameters such as the nature of the rubber compounds of which the tread is made also have an impact on the properties of the said tire. The choice and nature of the rubber compounds of which the tread is made are, for example, essential parameters as far as wear properties are concerned. The choice and nature of the rubber compounds of which the tread is made also have an impact on the grip of the tire.

It is also known practice for other types of tire to produce treads comprising incisions, more particularly for tires intended to run on ground covered with snow, black ice, or wetness.

Such treads are usually provided with raised elements of the rib or block type, separated from one another in the circumferential direction and/or in the transverse direction by transverse and/or circumferential grooves. These treads then also comprise incisions or slits, the non-zero widths of which are very much smaller than those of the aforementioned grooves. By making a plurality of cuts that open onto the tread surface a plurality of rubber edges is created and these cut into the layer of water that may be present on the road surface in order to keep the tire in contact with the ground and create cavities that may potentially form ducts intended to collect the water present in the contact patch via which the tire makes contact with the road and remove if it they are configured in such a way as to open out outside the contact patch.

Numerous types of incision have already been proposed with a view to improving the grip of the tire on the surfaces in question.

Document FR 2 418 719 for example describes incisions which may be normal to the surface of the tread or inclined with respect to the direction perpendicular to the said surface.

Document FR 791 250 describes incisions that run in a wave along the surface of the tread.

Motorcycle performance means that nowadays better control over the transfer of torque is desired, this notably meaning driving torque in terms of the rear wheel and braking torque in terms of the front wheel.

As stated previously, the architecture of the crown reinforcement of the tire or indeed the nature of the rubber compounds of the tread may allow such effects to be obtained.

Torque transfer is also dependent on the area of contact with the ground. Now, curvatures that are particularly pronounced, notably in the axial direction, in motorcycle tires do nothing to encourage the flattening of the tire when riding in a straight line. The tread is loaded in compression and this effectively limits the surface area of the contact patch by which the tire is in contact with the ground and, what is more, leads to energy losses.

Circumferential furrows have already been proposed in an attempt to limit this compressive loading of the tread. The result is satisfactory from an energy standpoint but the lack of rubber compound corresponding to the location of the furrows decreases the area of tire in contact with the ground in the contact patch and therefore limits the force that can be transmitted under braking, particularly in the case of the front tire or during acceleration in the case of the rear tire.

SUMMARY OF THE INVENTION

It is therefore an object of the invention to provide a motorbike tire of which the properties, in terms of the transfer of torque or transmission of force to the ground is or are improved.

This object has been achieved according to one aspect of the invention using a tire for a motorized two-wheeled vehicle comprising a reinforcing structure of the carcass type, made up of reinforcing elements, anchored on each side of the tire to a bead the base of which is intended to be mounted on a rim seat, each bead being extended radially outwards by a sidewall, the sidewalls radially towards the outside joining to a tread, at least the central part of the tread comprising at least one circumferentially continuous cut, and the said circumferentially continuous cut being made up, for at least 80% of its length of at least one incision and at most 20% of at least one part having a width greater than that of an incision and the apparent area of the said at least one incision being greater than the apparent area of the said at least one part having a width greater than that of an incision.

For preference, the circumferentially continuous cut is formed for at least 85% of its length of least one incision.

Within the meaning of the invention, an incision is a cut that forms two walls and in which the distance between the walls measured along the normal to a plane tangential to one of the walls is less than 1.5 mm and preferably less than 1 mm. The said distance on the surface of the tread is at least equal to the said distance at the bottom of the incision, which means to say at the point furthest from the surface of the tread. Particularly in the case of a motorbike tire, as the thickness of the tread is relatively small, any widening of the said distance from the surface of the tread towards the bottom of the incision cannot be allowed to exist in case it causes the edges of the incision to collapse at the surface of the tread thus reducing the area of the contact patch in which the tread makes contact with the ground.

Within the meaning of the invention, the apparent area of a cut is the area of the void or of the region devoid of material delimited by the walls of the said cut on the surface of the tread. It is measured on a tire that is inflated to the nominal pressure and unladen.

When the circumferentially continuous cut is formed of at least two incisions, the apparent area of the said at least one incision has be understood within the meaning of the invention to mean the sum of the apparent areas of each of the incisions.

When the circumferentially continuous cut is made up of at least two parts having a width greater than that of an incision, the apparent area of the said at least one part having a width greater than that of an incision must be understood within the meaning of the invention to mean the sum of the apparent areas of each of the said parts having a width greater than that of an incision.

The length of the circumferentially continuous cut is measured along the curved abscissa of a wall of the said cut.

The central part of the tire is the part corresponding to the crown of the tire and which is in contact with the ground when the tire is running in a straight line.

The longitudinal direction of the tire, or circumferential direction, is the direction corresponding to the periphery of the tire and defined by the direction of to running of the tire.

The expression "circumferentially continuous" means that the cut makes a complete turn of the tire, uninterrupted.

The transverse or axial direction of the tire is parallel to the axis of rotation of the tire.

The axis of rotation of the tire is the axis about which it rotates in normal use.

A circumferential plane or a circumferential plane of section is a plane perpendicular to the axis of rotation of the tire. The equatorial plane is the circumferential plane that passes through the center or crown of the tread and is therefore in the central part of the tread.

A radial or meridian plane contains the axis of rotation of the tire.

The radial direction is a direction intersecting the axis of rotation of the tire and perpendicular thereto. The radial direction is the intersection between a circumferential plane and a radial plane.

According to one preferred embodiment of the invention, the apparent area of the said at least one part having a width greater than that of an incision is less than 75% of the apparent area of the said at least one incision.

A tire thus produced according to the invention and mounted on the wheel of a motorbike effectively, when running in a straight line, allows the tire to flatten without introducing excessive compressive loadings into the rubber compounds of which the tread is made at the centre of the tire.

The inventors have been able to demonstrate that the presence, in the central part of the tread, of at least one circumferentially continuous cut made up, for at least 80% of its length, of at least one incision makes it possible to increase the area of the contact patch and therefore the transfer of torque while at the same time limiting the compressive loading of the rubber compounds in the equatorial plane of the tire when running in a straight line.

According to one preferred embodiment of the invention, the said at least one circumferentially continuous cut consists of at least a part having a width greater than 2.5 mm.

Within the meaning of the invention, the width of the said at least one part is equal to the width of the rectangle circumscribing the said at least one part, which means to say the smallest rectangle containing the said at least one part in its entirety.

According to this embodiment of the invention, the circumferentially continuous cut in the central part of the tread of the tire consists of at least one incision interrupted by at least one region of cutting of larger width greater than 2.5 mm. According to the invention, all of these regions represent at most 20% of the length of the circumferentially continuous cut.

Advantageously according to an embodiment of the invention, the said at most 20% of the cut that have a width greater than 2.5 min consist of several discontinuous parts. This is because the inventors have been able to demonstrate that a cut consisting of an incision has regions of cracking resulting from the manufacture of the tire. Specifically, the inventors have been able to demonstrate that regions of cracking or regions exhibiting risks of cracking occur in register with the joins between segments of the manufacturing molds. A tire mold is in fact made up of several segments which are assembled with one another in order to mold the tire during the curing or vulcanizing step. These discontinuous parts having a width greater than 2.5 mm are thus advantageously formed at the junctions between the segments that make up the molds.

The said at least one circumferentially continuous cut is thus advantageously formed for at least 5% of its length of at least one part having a width greater than 2.5 mm. This value of 5% more or less corresponds to the value of the said parts needed to cover all of the junctions between segments that make up the mold in which a tire is manufactured.

Advantageously too, each of the parts having a width greater than 2.5 mm has a length of between 2.5 and 10 mm. The length of a part is measured between the two ends of incisions that it connects; it is equal to the length of the rectangle circumscribing the said part, as defined hereinabove. Such lengths reduce the probability of cracks appearing in the rubber compounds of which the tread is made.

Advantageously to according to an embodiment of the invention, these parts have a cross section of oval type at the tread. The continuous curvatures on the cross section of the said parts likewise play a part in reducing the probability of cracks appearing in the rubber compounds used to make the tread.

According to other embodiments, the cross section of these parts at the surface of the tread may be of any geometric shape, such as polygonal for example.

According to other wording of the invention, the latter relates to a tire for a motorized two-wheeled vehicle comprising a reinforcing structure of the carcass type, made up of reinforcing elements, anchored on each side of the tire to a bead the base of which is intended to be mounted on a rim seat, each bead being extended radially outwards by a sidewall, the sidewalls radially towards the outside joining to a tread, at least the central part of the tread comprising at least one circumferentially continuous cut forming two walls; the said cut being made up for at least 80% of its length of regions the distances between the walls of which are less than one third of the distance between the walls of at most 20% of the length of the said cut and the apparent area of the said regions that make up at least 80% of the length of the said cut being greater than the apparent area of the other regions that make up at most 20% of the length of the said cut.

For preference, the said cut is made up for at least 85% of its length of regions the distances between the walls of which are less than one third of the distance between the walls of at most 15% of the length of the said cut.

According to an alternative embodiment of the invention, the said at least 80% of the length which are formed of at least one incision make an angle with the circumferential direction on the surface of the tread.

According to this alternative embodiment of the invention, the incisions have a main direction which intersects the circumferential direction. Such incisions encourage the tire to grip on a damp or wet road surface.

According to a preferred embodiment of the invention, the incisions form a Z-shaped line along the perimeter of the tire tread. The said at least one circumferentially continuous cut thus consists of a set of incisions, two successive incisions being directed in opposite directions with respect to the circumferential direction. Advantageously also, two successive incisions are separated by a portion of cut having a width greater than 2.5 mm. These parts will, once again, even when their locations do not correspond to junctions between mold segments, limit the risk of cracking within the rubber compounds of the tread. This is because if these parts with a width greater than 2.5 mm were not present, the incisions would meet forming an angle likely to initiate cracking.

According to one preferred embodiment of the invention, between the said at least two parts having a width greater than 2.5 mm, the said at least one circumferentially continuous cut consists of at least one curve on the surface of the tread. According to such an embodiment, the incisions promote even better tire grip on wet or damp road surfaces.

One advantageous alternative form of the invention is for the depth of the incisions to vary in the axial direction notably to take account of different rates of wear in the axial direction of the tire and to obtain tread rigidities that vary in the axial direction.

According to an advantageous alternative form of the invention, at least the surface of the tread consists of a first polymer compound extending over at least part of the central part and of at least one second polymer compound having physico-chemical properties different from those of the said first polymer compound and covering at least part of the axially external parts of the tread.

Such an alternative form of the invention makes it possible to create a tread which, for example, has improved wear properties at the center of the tread and improved grip properties on the axially external parts.

Such an alternative embodiment of the invention notably proposes for a tread having improved wear properties to coincide with the said at least one circumferentially continuous cut.

According to one advantageous embodiment of the invention, in order to give the tire symmetric properties, the central circumferential band is advantageously centered on the equatorial plane. In other embodiments, intended for example for tires intended to run on a circuit in which all the bends are essentially in the same direction, it is possible for the central circumferential band not to be centered on the equatorial plane.

Advantageous alternative embodiments of the invention may foresee the presence of five or more circumferential bands to form at least the surface of the tread and thus provide a gradual evolution in the properties of the said tread from the equatorial plane out towards the shoulders. As before, such an embodiment may be symmetric with respect to the equatorial plane or non-symmetric, the distribution of the bands differing in terms of their composition or in terms of their distribution about the equatorial plane.

According to a preferred embodiment of the invention, the second polymer compound is of a composition different from that of the first polymer compound and, more preferably still, the second polymer compound has grip properties superior to those of the said first polymer compound.

According to other embodiments, different properties can be obtained with identical compounds but using different vulcanizing conditions.

Advantageously also, the radial thicknesses of the first and second polymer compounds may differ, so as to optimize tread wear in the axial direction. Advantageously also, the thicknesses vary gradually.

According to one preferred embodiment of the invention, the second polymer compound has a Shore A hardness different from that of the first polymer compound.

The Shore A hardness of the polymer compounds after curing is assessed in accordance with the ASTM D 2240-86 standard.

According to one preferred embodiment of the invention, the reinforcing elements of the carcass-type reinforcing structure make with the circumferential direction an angle of between 65 and 90°.

According to a variant of the invention, the crown reinforcing structure comprises at least one layer of reinforcing elements that make with the circumferential direction angles of between 10 and 80°.

According to this alternative form, the crown reinforcing structure advantageously comprises at least two layers of reinforcing elements, the reinforcing elements between them making angles of between 20 and 160°, from one layer to the next, preferably angles in excess of 40°.

According to one preferred embodiment of the invention, the reinforcing elements of the working layers are made of textile material.

According to another embodiment of the invention, the reinforcing elements of the working layers are made of metal.

In one advantageous embodiment of the invention, notably with a view to optimizing the rigidities of the reinforcing structure along the meridian of the tire, and in particular at the edges of the working layers, the angles made by the reinforcing elements of the working layers with the longitudinal direction can vary in the transverse direction such that the said angles are greater on the axially external edges of the layers of reinforcing elements by comparison with the angles measured at the equatorial plane of the tire.

One embodiment of the invention has the tire notably consisting of a crown reinforcing structure which comprises at least one layer of circumferential reinforcing elements; according to the invention, the layer of circumferential reinforcing elements consists of at least one reinforcing element oriented to make an angle less than 5° with the lower longitudinal direction.

For preference also, the reinforcing elements of the layer of circumferential reinforcing elements are metal and/or textile and/or glass. The invention notably foresees the use of reinforcing elements of different kinds within one and the same layer of circumferential reinforcing elements.

For preference also, the reinforcing elements of the layer of circumferential reinforcing elements have an elastic modulus higher than 6000 N/mm$^2$.

One alternative embodiment of the invention advantageously has it that the circumferential reinforcing elements are distributed in the transverse direction at a variable pitch.

The variation in the pitch between the circumferential reinforcing elements takes the form of a variation in the number of circumferential reinforcing elements per unit length in the transverse direction and therefore of a variation in the density of circumferential reinforcing elements in the transverse direction and hence of a variation in circumferential rigidity in the transverse direction.

BRIEF DESCRIPTION OF THE DRAWINGS

Further details and advantageous features of the invention will become more clearly apparent hereinafter from the description of the embodiments of the invention given with reference to the following drawings.

DETAILED DESCRIPTION OF THE DRAWINGS

In order to make them easier to understand, FIGS. 1 to 4 are not drawn to scale.

Figure 1:
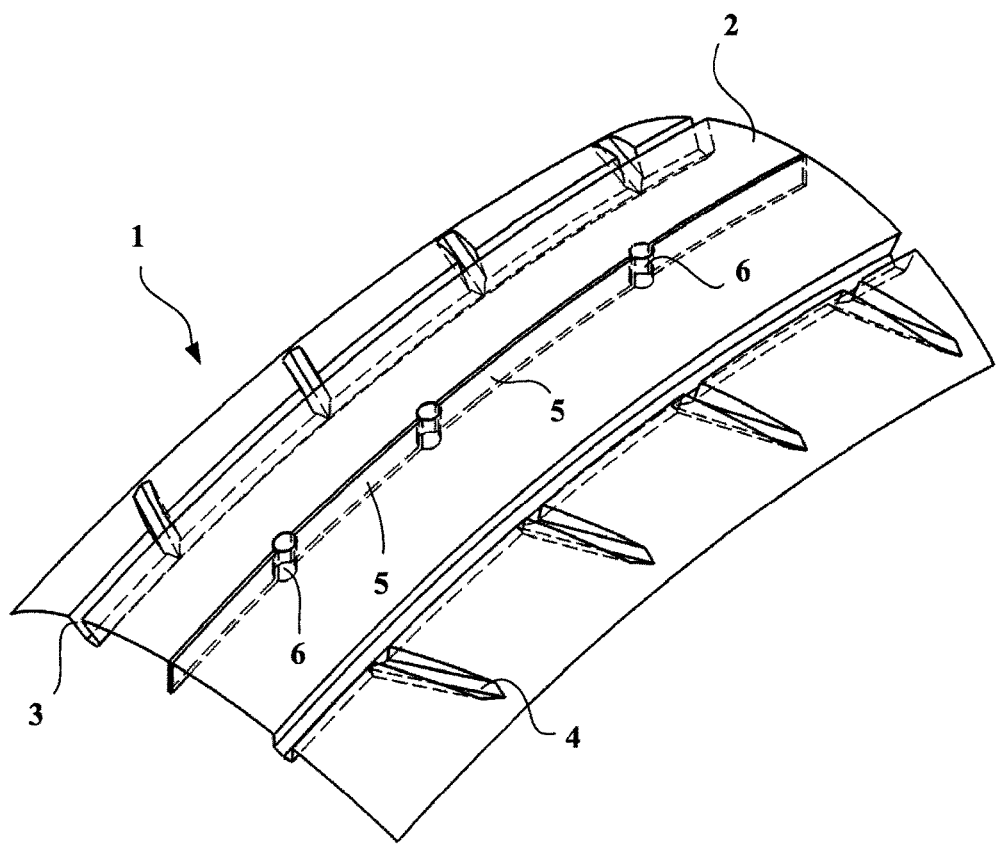
FIG. 1 is a partial perspective view of a diagram of a tire according to a first embodiment of the invention.

FIG. 1 depicts a partial perspective view of a tire 1, and more specifically of the external surface 2 of the tread thereof, intended to be fitted to the front wheel of a motorbike. The tire 1 has a curvature in excess of 0.15 and preferably in excess of 0.3. The curvature is defined by the ratio Ht/Wt, which means the ratio of the height of the tread to the maximum width of the tread of the tire.

In a way which has not been depicted in the figures, the tire 1 comprises a carcass reinforcement consisting of a layer comprising reinforcing elements of textile type. The layer consists of reinforcing elements laid radially. The radial positioning of the reinforcing elements is defined by the angle at which the said reinforcing elements are laid; a radial arrangement corresponds to the said elements being laid with respect to the longitudinal direction of the tire at an angle of between 65 and 90°.

The carcass reinforcement is anchored on each side of the tire 1 in a bead the base of which is intended to be mounted on a rim seat. Each bead is extended radially outwards by a side wall, the side wall radially towards the outside joining to the tread.

The tire 1 further comprises a crown reinforcement consisting for example of two layers of reinforcing elements making angles with the circumferential direction, the said reinforcing elements being crossed from one layer to the next making between them angles for example of 50° in the region of the equatorial plane, the reinforcing elements of each of the layers making an angle of, for example, 25°, with the circumferential direction.

The crown reinforcement may even consist of a layer of circumferential reinforcing elements instead of the layers of reinforcing elements that make angles with the circumferential direction or alternately in combination therewith.

The tread 2 of the tire 1 comprises a tread pattern consisting of circumferentially directed continuous grooves 3 and transverse grooves 4, the main direction of the latter being at a slight angle to the radial direction in order to give the said tread pattern a direction.

According to the invention, the tread has a circumferential cut consisting of incisions or slits 5, the non-zero widths of which are very much smaller than those of the abovementioned grooves 3 and 4. These incisions 5 are joined together by regions of greater width that can be qualified as wells 6.

In the case of FIG. 1, the circumferentially continuous cut consisting of the incisions 5 and of the wells 6 more or less coincides with a circumferential plane and, in this particular instance, with the equatorial plane.

The presence of the incisions 5 makes it possible during running to increase the flattening-out of the tread in order to optimize the area of the contact patch. The presence of the incision also makes it possible to reduce the compressive loading on the rubber compounds of which the tread is made. Further, the short distance between the walls of the incision makes it possible to avoid an absence of material that would reduce the area of the contact patch.

This area is, however, slightly reduced by the presence of the wells which do not themselves close up completely at the surface of the tread as the tire is squashed down onto the ground. This is why these do not represent any more than 20% of the length of the circumferentially continuous cut; torque transfer is almost undisturbed by their presence in the contact patch.

As explained earlier, the wells are advantageously located at the junctions between mold segments in order to avoid the risk of cracking. Depending on the number of segments that make up the mold, it is possible to provide additional wells in order to give the surface of the tread a more uniform appearance as the wheel turns.

The apparent area of all of the incisions 5 of the tire is equal to 920 mm$^2$.

The apparent area of all of the wells 6 of the tire is equal to 585 mm$^2$.

According to the invention, the apparent area of all of the incisions 5 is greater than the apparent area of all of the wells 6.

Figure 2:
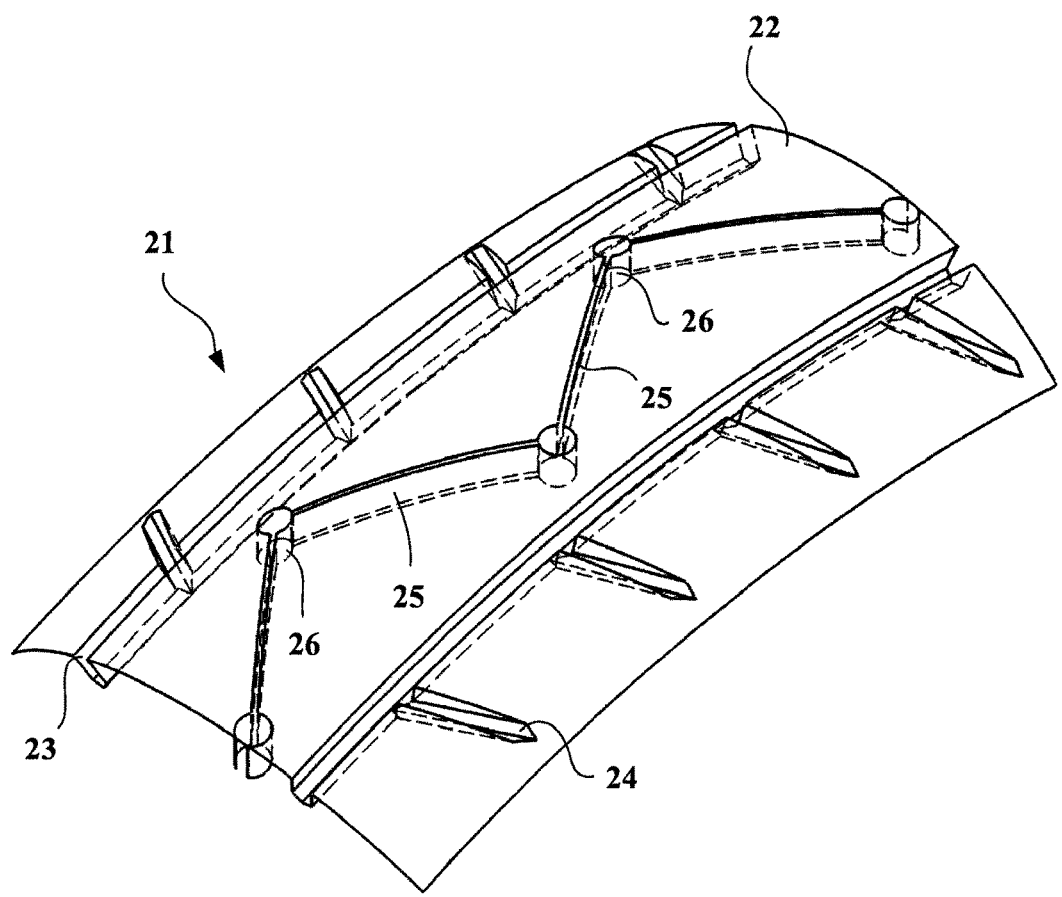
FIG. 2 is a partial perspective view of a diagram of a tire according to a second embodiment of the invention.

FIG. 2 depicts a partial perspective view of a tire 21 similar to that of FIG. 1 and which differs therefrom by a circumferentially continuous cut which on the surface of the tread 22 is Z-shaped or, more precisely, consists of a succession of incisions 25 the orientation of which makes an angle with the circumferential direction and which are connected to one another by wells 26.

This orientation of the incisions means that in addition to their contribution towards the flattening of the tire in the torque-transfer contact patch, they can also contribute directly to improving grip, particularly on wet surfaces.

The presence of the wells 26 advantageously coincides according to the invention with the regions where the mold segments meet. They are also present at the end of each of the incisions to join two incisions together and avoid there being any direct connection between two incisions as this might be a potential source of crack initiators.

The apparent area of all the incisions 25 of the tire is equal to 1140 mm².

The apparent area of all of the wells 26 of the tire is equal to 585 mm².

According to the invention, the apparent area of all of the incisions 25 is greater than the apparent area of all of the wells 26.

Figure 3:
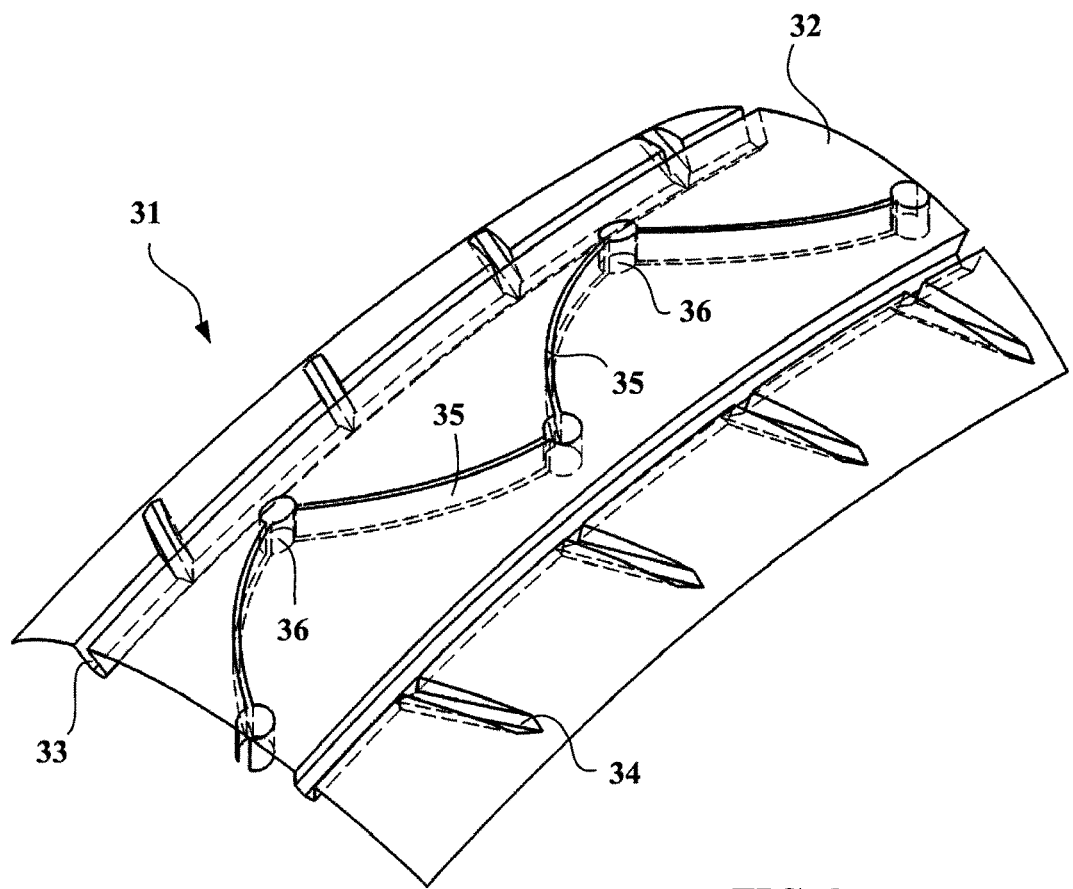
FIG. 3 is a partial perspective view of a diagram of a tire according to a third embodiment of the invention.
Figure 4:
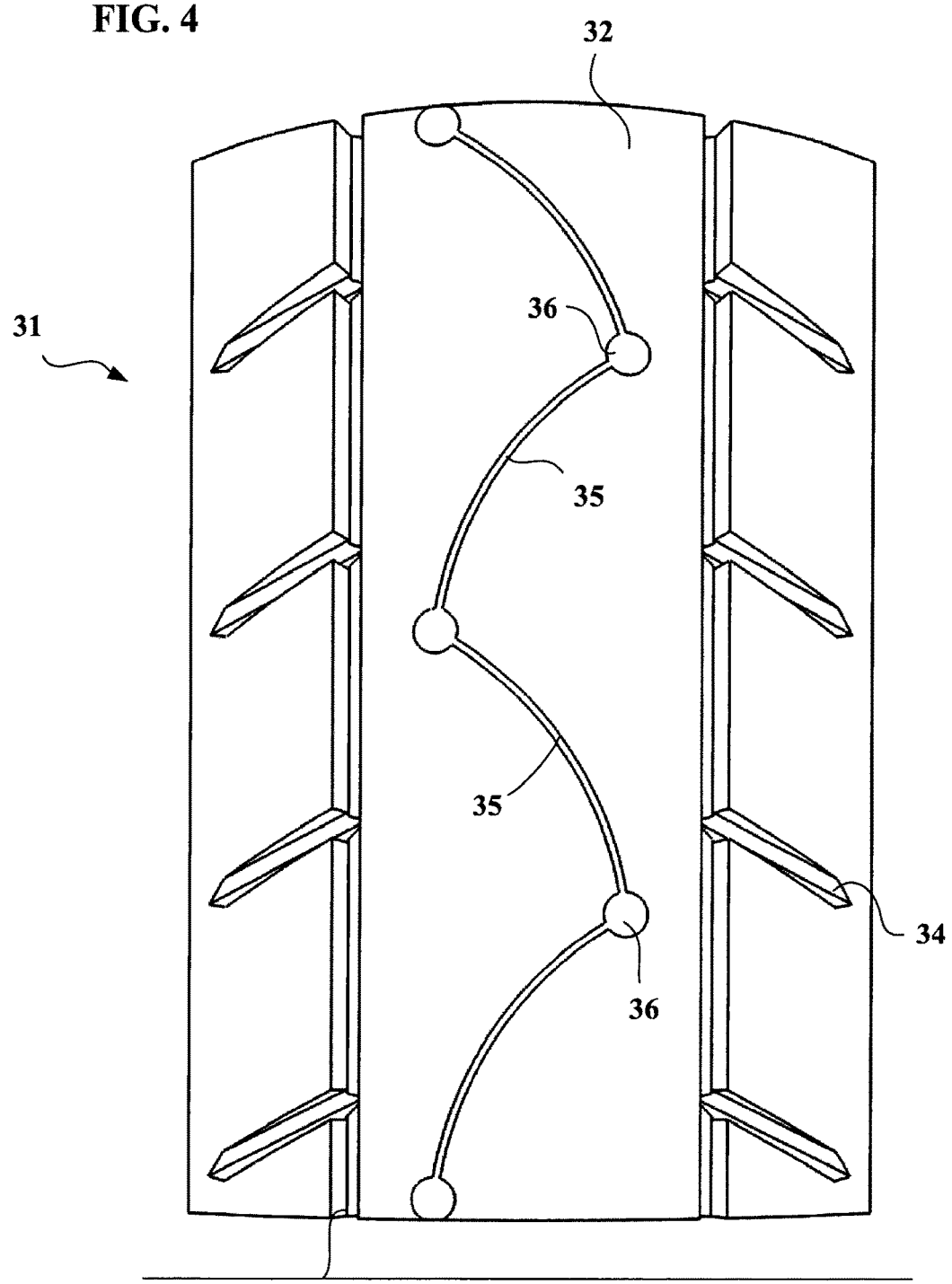
FIG. 4 is a partial view from above of a diagram of a tire according to the third embodiment of the invention.

FIGS. 3 and 4 respectively depict a partial perspective view and a partial view from above of a tire 31 differing from that of FIG. 2 by incisions 35 of which the line on the surface of the tread 32 is no longer straight but curved.

This curved profile of the incisions 35 encourages even better grip, notably on wet surfaces.

The apparent area of all of the incisions 35 of the tire is equal to 1180 mm².

The apparent area of all of the wells 36 of the tire is equal to 585 mm².

According to the invention, the apparent area of all of the incisions 35 is greater than the apparent area of all of the wells 36.

Contact patch area measurements were taken firstly on a tire according to the invention as depicted in FIG. 1 and secondly on a first reference tire R1 of the same size but with no continuous circumferential cut and on a second reference tire R2 having a circumferential groove with a width of 6.5 mm.

The tire measured is a tire of size 180/55 ZR 17, inflated to 2.5 bar and compressed under a load of 180 daN.

The measured relative values were 100 for the reference tire R1, 95 for the reference tire R2 and 110 for the tire according to the invention.

The circumferentially continuous cut according to the invention does therefore allow an increase in the surface area of the contact patch and therefore promotes better transmission of driving or braking torque.

The value obtained with reference tire R2 also confirms that a circumferential groove limits the compressive loading on the tread and therefore limits energy losses but that the absence of rubber compound corresponding to the groove reduces the surface area of the tire in contact with the ground in the contact patch.

The invention must not be considered to be limited to the description of the examples above. In particular, the invention must not be considered to be limited to the case of a tire intended to be fitted to the rear wheel of a motorized two-wheeled vehicle as it is also of benefit for a front wheel.

The invention claimed is:

1. A tire for a motorized two-wheeled vehicle comprising:
   a carcass reinforcing structure made up of reinforcing elements, anchored on each side of the tire to a bead the base of which is adapted to be mounted on a rim seat, each bead being extended radially outward by a sidewall, the sidewalls extending radially toward the outside joining to a tread,
   wherein at least the central part of the tread comprises at least one circumferentially continuous cut having opposed uninterrupted walls,
   wherein said circumferentially continuous cut is made up, for at least 80% of its length, of at least two incisions and, for at most 20% of its length, of at least two wells, each well having a width greater than that of an incision,
   wherein an apparent area of said at least two incisions is greater than an apparent area of said at least two wells,
   wherein each incision is located between two wells,
   wherein each incision is curved along a circumferential direction of the surface of the tread,
   wherein the width of each incision is uniform along its depth, and
   wherein the wells and the incisions have the same depth.

2. The tire according to claim 1, wherein the apparent area of said at least two wells is less than 75% of the apparent area of said at least two incisions.

3. The tire according to claim 1, wherein at least one well has a width greater than 2.5 mm.

4. The tire according to claim 1, wherein said at least one circumferentially continuous cut is formed, for at least 5% of its length, of at least two wells having a width greater than 2.5 mm.

5. The tire according to claim 1, further comprising:
   at least one circumferentially continuous groove spaced axially apart from the at least one circumferentially continuous cut, and
   at least one transverse groove coupled to the at least one circumferentially continuous groove so as to intersect the circumferentially continuous groove at an angle to the radial direction to give the tread a tread pattern direction.

6. The tire according to claim 1, wherein the tire has at least a W speed rating.

7. A tire for a motorized two-wheeled vehicle comprising:
   a carcass reinforcing structure made up of reinforcing elements, anchored on each side of the tire to a bead the base of which is adapted to be mounted on a rim seat, each bead being extended radially outward by a sidewall, the sidewalls extending radially toward the outside joining to a tread,
   wherein at least the central part of the tread comprises at least one circumferentially continuous cut forming two walls configured as opposed uninterrupted walls,
   wherein said circumferentially continuous cut is made up, for at least 80% of its length, of incisions and, for at most 20% if its length, of at least two wells, wherein distances between walls of the incisions are less than one third of distances between walls of the wells,
   wherein an apparent area of said incisions is greater than an apparent area of the wells,
   wherein each incision is located between two wells,
   wherein each incision is curved along a circumferential direction of the surface of the tread,
   wherein a width of each incision is uniform along its depth, and
   wherein the wells and the incisions have the same depth.

8. The tire according to claim 1 or 7, wherein said at least two incisions make an angle with the circumferential direction on the surface of the tread.

9. The tire according to claim 8, wherein the width of each of well is greater than 2.5 mm.

10. The tire according to claim 1 or 7,
    wherein the tread comprises at least one central part and two axially external parts, and
    wherein at least the surface of the tread consists of a first polymer compound extending over at least part of the central part and of at least one second polymer compound having physico-chemical properties different from those of said first polymer compound and covering at least part of the axially external parts of the tread.

11. The tire according to claim 1 or 7, wherein the reinforcing elements of the carcass-type reinforcing structure make with the circumferential direction an angle of between 65° and 90°.

12. The tire according to claim 1 or 7,
further comprising a crown reinforcing structure positioned radially inward of the tread and surmounting carcass reinforcing structure, the crown reinforcing structure comprising at least one working layer of reinforcing elements,
wherein the reinforcing elements make with the circumferential direction angles of between 10° and 80°.

13. The tire according to claim 12, wherein the angles made by the reinforcing elements of said at least one working layer with the longitudinal direction vary in a transverse direction.

14. The tire according to claim 1 or 7, further comprising a crown reinforcing structure positioned radially inward of the tread and surmounting carcass reinforcing structure, the crown reinforcing structure comprising at least one layer of circumferential reinforcing elements.

15. The tire according to claim 14, wherein the circumferential reinforcing elements are distributed in a transverse direction at a variable pitch.

16. The tire according to claim 1 or 7, wherein each well is circular.

17. The tire according to claim 1 or 7, wherein each well has a width greater than 2.5 mm and each incision has a width less than 1.5 mm.

\* \* \* \* \*